Patented Aug. 31, 1926.

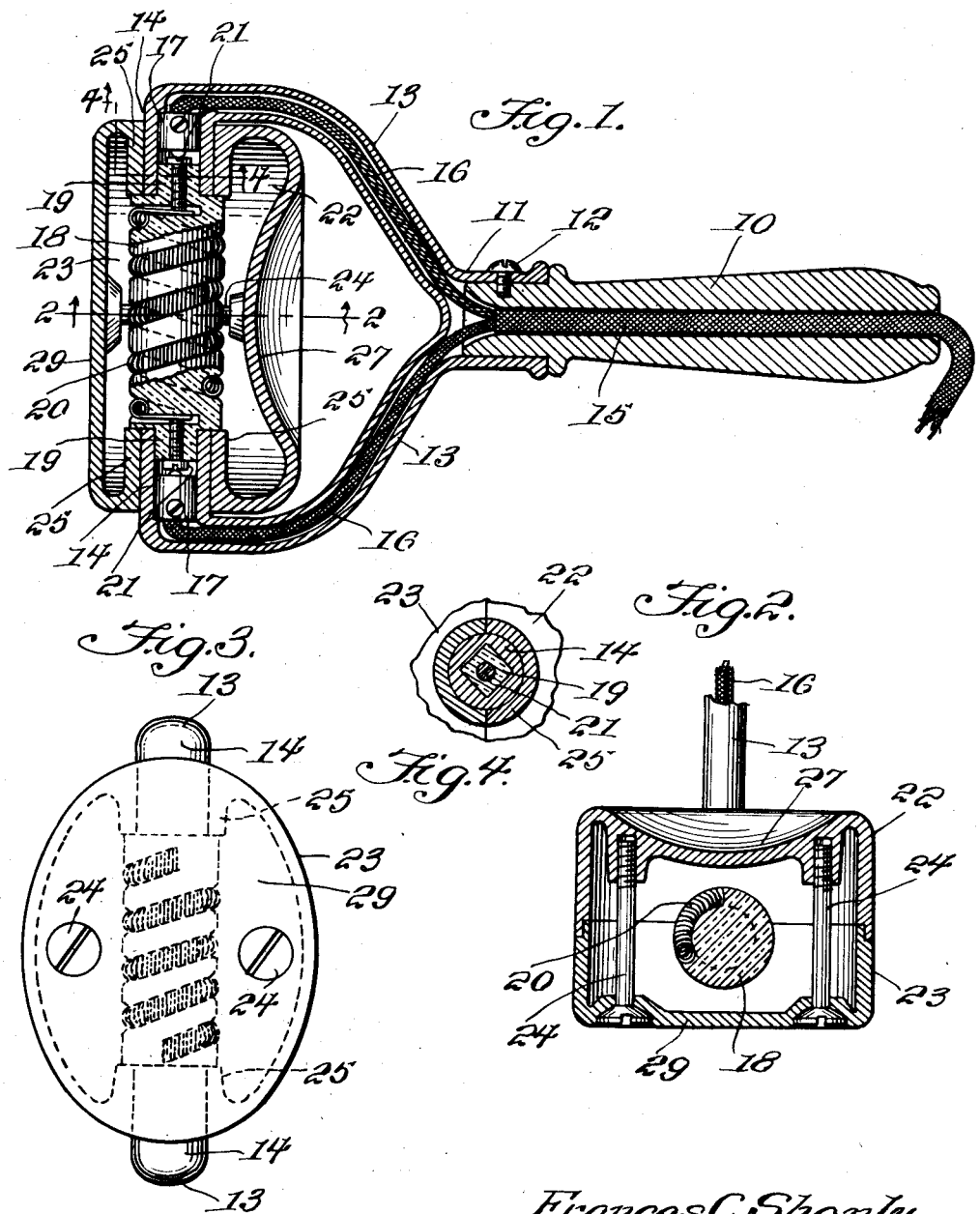

1,597,732

UNITED STATES PATENT OFFICE.

FRANCIS C. SHANLY, OF BELLINGHAM, WASHINGTON.

IRON.

Application filed January 31, 1925. Serial No. 6,032.

This invention contemplates the provision of an electric facial iron which is particularly meritorious for steaming and soothing the face prior to the application of cosmetics, and also advantageous for use in preparing the skin for shaving.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a sectional view through the iron forming the subject matter of the present invention.

Figure 2 is a sectional view on the line 2—2 of Figure 1.

Figure 3 is a view in elevation.

Figure 4 is a sectional view on the line 4—4 of Figure 1.

The iron forming the subject matter of the present invention comprises a handle 10, one end of which is received by a socket 11 and secured thereto by means of a suitable fastening element 12. Projecting from this socket is a pair of hollow tubular members 13 which unitedly define a yoke between the extremities of which the facial or steaming element is mounted for rotation. As shown in Figure 1, the extremities of these tubular members extend inwardly toward each other and are indicated at 14, each extremity being substantially squared to receive and support the heating element to be hereinafter described. The electric cord 15 passes through the handle 10 as shown and has its branches 16 passed through the tubular members 13, each branch being associated with a contact 17 arranged as shown in Figure 1. The heating element includes a core 18 which has its opposite ends reduced as at 19 and these reduced ends are received by the extremities of the tubular members 13. The core 18 is grooved to accommodate the heating coil 20, and the terminals of the coil are associated with contacts 21 which engage the adjacent contacts 17. By reason of this arrangement, the heating element is supported between the extremities of the tubular members 13 and is held fixed relatively thereto.

The heating element is positioned within a hollow casing preferably of the cross sectional configuration illustrated in Figures 1 and 2, and the casing is preferably made of two sections 22 and 23 respectively, which sections are held together by suitable fastening elements 24; the opposed ends of the casing are formed with bearings 25 which surround the extremities 14 of the tubular members, the casing being mounted for rotation thereon. The casing is adapted to be moved over the face for the purpose of treating the skin, that is for the purpose of steaming and soothing the skin prior to the application of cosmetics, or with a view to properly preparing the skin for shaving. The casing may be of any suitable contour, but it is preferably formed with a flat side 29 and a concaved side 27 so that certain parts of the face may be cupped during the use of the iron. The tubular members 13 are also constructed of resilient material, that is to say that they possess a certain degree of resiliency to permit them to be slightly sprung apart to facilitate the association of these members with the facial element in its entirety, or the removal of the facial element as the occasion may require. The invention is very simple in construction and is particularly useful where hot water is not available.

While it is believed that from the foregoing description, the nature and advantages of the invention will be readily apparent, I desire to have it understood that I do not limit myself to what is herein shown and described, and that such changes may be resorted to when desired, as fall within the scope of what is claimed.

Having thus described the invention, I claim:

An electrical facial iron of the character described comprising a handle, a yoke carried by one end thereof and having its extremities extended inwardly toward each other, and provided with openings of rectangular contour in cross section, an electric cord passed through the handle and yoke, contacts secured to the ends of said cord and arranged in the openings of said yoke extremities, a core including reduced squared end portions received by the extremities of the yoke and having slots immediately adjacent said extremities, said core being spirally grooved throughout its length, a heating coil arranged in said grooves and having its extremities received by said slots, threaded contacts screwed into the reduced ends of the core to engage the ends of said heating element to hold the latter fixed to said core, said contacts being engaged by the first mentioned contacts carried by said yoke, and a casing enclosing said heating element and mounted on the extremities of the yoke for rotation, said casing including a flat side and a concaved side for the purpose specified.

In testimony whereof I affix my signature.

FRANCES C. SHANLY.